GENERATOR FOR PRODUCING A SEQUENCE OF HARMONIC OSCILLATIONS OF A FUNDAMENTAL FREQUENCY

Filed Nov. 14, 1960

INVENTORS
JOHANNES ENSINK
PETRUS G. F. PLOEGAERT
BY
AGENT 3,134,915

GENERATOR FOR PRODUCING A SEQUENCE OF HARMONIC OSCILLATIONS OF A FUNDAMENTAL FREQUENCY

Johannes Ensink and Petrus Gustaaf Franciscus Ploegaert, Hilversum, Netherlands, assignors to North American Philips Company, Inc., New York, N.Y., a corporation of Delaware Filed Nov. 14, 1960, Ser. No. 69,022
Claims priority, application Netherlands Dec. 2, 1959
6 Claims. (Cl. 307—106)

The invention relates to a generator for producing a sequence of harmonic oscillations of a fundamental frequency, in which a coil having saturable, ferromagnetic core is employed. The core with its saturable core forms part of a parallel circuit which is tuned to the fundamental frequency when the core is saturated. The parallel circuit is included in the output circuit of an amplifier controlled by the fundamental oscillation. The harmonic generator is also provided with a series of selection filters tuned to the harmonics of the fundamental oscillation and fed by the oscillations derived from the saturable core coil.

For various uses, particularly with the production of carrier waves for carrier frequency telephone apparatus, such so-called harmonic generators must meet very severe requirements in order to ensure the desired discrimination of, for example, 80 db, between the harmonics obtained by frequency selection, with respect to the relative waveform and the relative spaces of the pulses produced in the saturable core coil. It is also desirable for the level of the various harmonics, irrespective of the ordinal number, to be substantially constant. In the transistorized embodiment of such harmonic generators practical difficulties arise due to certain transistor characteristics.

The invention has for its object to provide such a transistorized harmonic generator, in which the said requirements are fulfilled in a simple manner.

The device according to the invention is characterized in that the collector circuit of a transistor amplifier comprises a parallel resonant circuit in which the saturable core coil is connected in series with a circuit capacitor. A diode is connected between the collector electrode of the transistor amplifier and the parallel circuit. The current pass direction of the diode corresponds to the collector current direction of the transistor.

The invention and its advantages will now be described more fully with reference to the figures.

Figure 1:
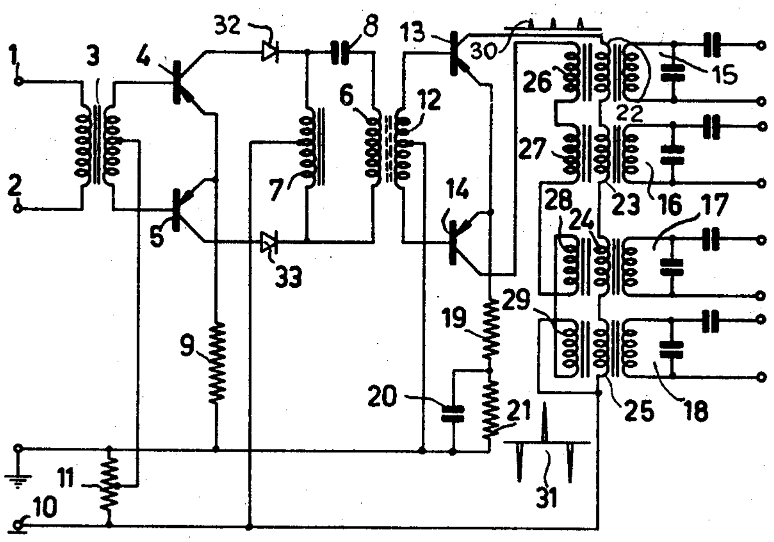

FIG. 1 shows a harmonic generator according to the invention, which is used as a carrier-wave generator for use in a carrier-frequency telephone apparatus and FIGS. 2*a*–2*e* show a few time diagrams to explain the harmonic generator shown in FIG. 1.

The harmonic generator illustrated in FIG. 1 according to the invention is designed for producing the channel carrier waves in a carrier-frequency telephone apparatus as the harmonics of a fundamental frequency. The fundamental frequency waves are applied to the input terminals 1, 2 of the harmonic generator. The fundamental frequency may be, for example, 4 kc./s., while the channel carrier waves constitute the harmonics of the fundamental frequency, such as 12, 16, 20, 24, 28, and 32 kc./s. in the band of 12 to 32 kc./s.

Figure 2:
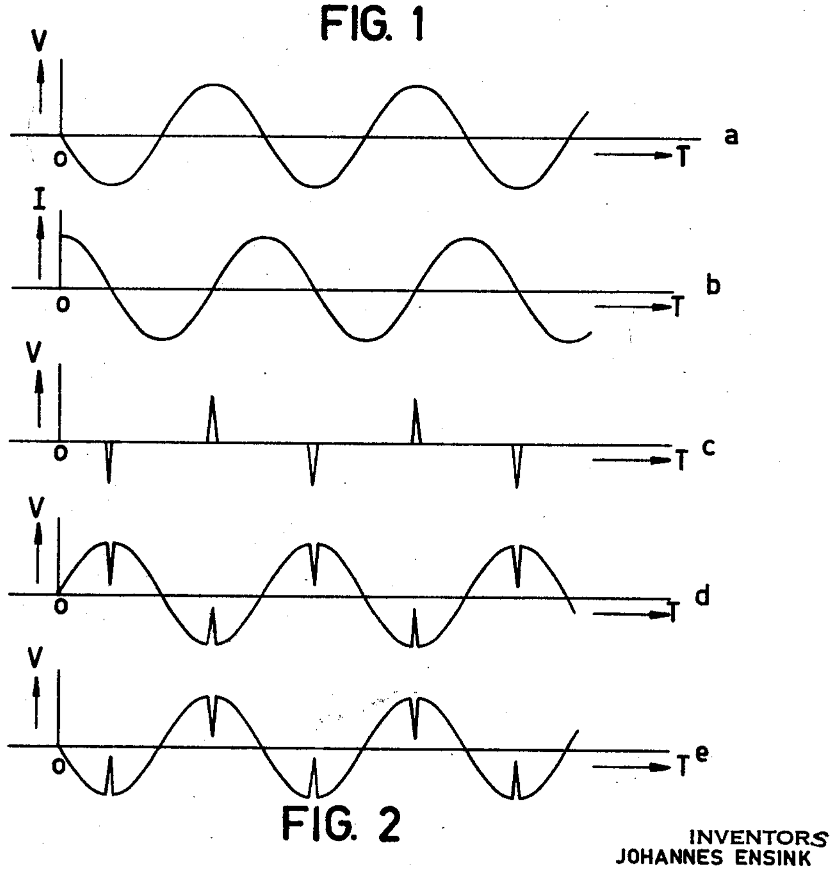

In the embodiment shown the oscillations of the fundamental frequency originating from the input terminals 1, 2 are applied by way of a transformer 3 to a transistorized push-pull amplifier 4, 5 for energy amplification, and thence to a coil 6 included in the collector circuits of the transistors 4, 5. The coil 6 has a saturable ferromagnetic core, for example of ferrite, and coil 6 is included, in order to step up the current passing through it, in a parallel circuit comprising a capacitor 8 and a coil 7. The parallel circuit is tuned to the fundamental frequency, when the core of the coil 6 is saturated. The coil 6 with the saturable core is connected in series with the circuit capacitor 8. The transistor push-pull amplifier 4, 5 is connected in class AB, with the emitter electrodes being connected to earth via a common emitter resistor 9 and the bias voltage of the base electrodes being derived from a voltage divider 11, connected between the negative terminal 10 of the supply source and earth. If the fundamental oscillation, which is illustrated in FIG. 2*a*, is fed to the input terminals 1, 2 of the harmonic generator, the transistors 4, 5 are alternately conductive in the successive half periods and a current passes through the tuned circuit 6, 7, 8. The amplitude of the current is stepped up with respect to the collector current of the transistors 4, 5 by a factor determined by the quality of the circuit 6, 7, 8. FIG. 2*b* illustrates the circuit current passing through the coil 6 with the saturable core. This current leads the circuit voltage by 90 degrees, since the coil 6 is included in the capacitative branch of the resonant circuit 6, 7, 8.

Each time the current in coil 6 passes the zero line, the core of the coil 6 changes from the saturated condition into the unsaturated condition and owing to the inductance variation of the coil 6, a sharp voltage pulse is produced. The polarity of this pulse is determined by the direction of the circuit current passing through the saturable coil 6. In successive half periods of the circuit current the saturable coil 6 has thus produced across it pulses of opposite polarities (cf. FIG. 2*c*). These pulses are supplied by way of a coil 12, coupled with the coil 6, to class C-connected push-pull amplifier 13, 14 and thence to a sequence of selection filters 15, 16, 17 and 18 tuned to the channel carrier waves. In the class C-connected push-pull transistor amplifier 13, 14 the emitter electrodes are connected to earth via the series combination of a resistor 19 and a resistor 21, shunted by a smoothing capacitor 20. The collector circuit of each of the transistors 13, 14 includes the series combination of coils 22, 23, 24, 25 and 26, 27, 28, 29 respectively. The coils associated with the transistor 13 and the coils associated with the transistor 14 are coupled with the circuit coil of the selection filters 15, 16, 17, 18, with such polarity that the coils 22, 26 and 23, 27 respectively, connected to the circuit coil of the selection filters 15 and 16 respectively have the same sense of winding and the coils 24, 28 and 25, 29 respectively connected to the circuit coil of the selection filters 17 and 18 respectively have opposite senses of winding. The structure of the selection filters 15, 16, 17 and 18 is thus simplified, since the pulse pattern 30 containing only the even-numbered harmonics of the fundamental frequency is applied to the filters 15 and 16, and the pulse pattern 31, which contains only the odd-numbered harmonics is applied to the filters 17 and 18. Thus the channel carrier waves in the frequency band from 12 to 32 kc./s. are derived from the output terminals of the selection filters 15, 16, 17, 18. In the figure only four filters are illustrated, for the sake of clarity.

An important property of the harmonic generator shown with the transistors is that the pulses produced by the saturable coil 6, and occurring at the instants when the circuit voltage of the fundamental frequency has an extreme value, exhibit a sense which is opposite that of the extreme value of the then occurring circuit voltage of the fundamental frequency. For example, FIGS. 2*d* and 2*e* illustrate the voltages at the circuit ends connected to the collector electrodes of the transistors 4 and 5 respectively. Owing thereto the transistors 4, 5 can be controlled to the optimum by the fundamental oscillation, which is particularly advantageous in view of the low supply voltages of the transistors 4, 5. This embodiment of the harmonic generator also minimizes the influence of the properties of the transistors 4, 5 on the carrier waves produced, by including a diode 32 or 33 between the collector electrodes of the transistors 4 or 5 respectively and the parallel circuit 6, 7, 8. The pass direction of these diodes is the same as the direction of the collector current of the transistors 4 and 5 respectively.

If, for example, the oscillation of the fundamental frequency at the instant $T=0$ is fed to the base of the transistor 4 (cf. FIG. 2*a*), the transistor 4 will be conductive and will supply collector current to the resonant circuit 6, 7, 8 without being hindered via the diode 32, so that the circuit voltage will increase in a positive sense (cf. FIG. 2*d*). The collector voltage of the transistor 4, which is determined by the sum of the negative supply voltage and the positive circuit voltage, will increase accordingly and become approximately equal to the emitter voltage in the proximity of the maximum circuit voltage, so that the collector-emitter impedance drops to a very low value (bottoming of the transistor 4). As a consequence, the resonant circuit 6, 7, 8 can now supply current to earth by way of the extremely low collector-emitter impedance and the common emitter resistor 9. This reversal of the collector current, which could affect the waveform and the instant of occurring of the pulse produced in the saturable coil 6, is avoided by the diode 32, since the diode 32 is then blocked and thus constitutes for the said reversed collector current, practically an interruption. The pulse can then be formed across the saturable coil 6 without being affected by the transistor 4. This formation of the pulse appears, moreover, to be largely independent of a variation in the transistor properties, for example owing to temperature fluctuations.

During the conducting period of the transistor 4 the transistor 5 is blocked and the collector electrode of the transistor 5 will follow the voltage at the circuit end connected to the collector, which voltage increases in a negative sense (cf. FIG. 2*e*). The voltage across the diode 33 is then substantially equal to zero. If at a minimum value of the circuit voltage a sharp pulse occurs in a positive sense, the collector voltage cannot follow this abrupt voltage variation owing to the comparatively high collector-base- and collector-emitter capacities and the diode 33 is then blocked, so that this sharp pulse cannot reach the collector of transistor 5, which pulse would otherwise produce an attenuation of the higher frequency components of the pulse spectrum.

During the next following half period of the fundamental oscillation the transitsor 5 is conductive and the transistor 4 is blocked, the cycle above-described being then repeated.

In this manner an influence of the properties of the transistors 4, 5 on the channel carrier waves derived from the outputs of the selection filters is suppressed to a great extent. It appears, particularly, that the waveform and the interval of the pulses produced remain accurately the same irrespective of the transistors 4, 5 employed. As a result, undue, odd-numbered harmonics of the pulse spectrum of the pulse pattern 30 and undue even-numbered harmonics of the pulse spectrum of the pulse pattern 31 are materially attenuated, for example, by 40 db, so that the desired discrimination of 80 db of the various harmonics can be obtained by simple selection filters 15, 16, 17 and 18. It has appeared, for example, that even when exchanging the transistors 4, 5, the discrimination of the produced carrier waves remains constant within 3 db, while the amplitude of the maximum channel carrier frequency drops only by 0.1 db. The improvement obtained in the harmonic generator shown is important, since if these diodes 32, 33 are omitted, a decrease in the discrimination of the produced carrier waves of 20 db and a decrease of 1.5 db towards the higher carrier frequencies are obtained.

This harmonic generator was employed for producing group carrier waves in the band from 4.20 to 6.12 kc./s., starting from a fundamental frequency of 12 kc./s. The discrimination of the carrier waves produced being constant within 3 db. It appears that the drop of the amplitude of the highest group carrier wave frequency is 0.1 db, when the transistors 4, 5 are exchanged, whereas without the measures according to the invention these values amounted to 20 db and 6 db respectively.

In a practically tested harmonic generator of the type described above the following components were employed:

| | | |
|---|---|---|
| Transistors **4, 5** | | OC80 |
| Diodes **32, 33** | | OA73 |
| Coil **7** | mh | 2.5 |
| Supply voltage | v | 15 |
| Capacitor **8** | μμf | 71.5 |
| Coil **6** (unsaturated) | mh | 0.25 |
| Resistor **9** | ohms | 500 |

It should be noted that the amplifier 4, 5 and the amplifier 13, 14 may both be connected as class B amplifiers, if desired.

What is claimed is:

1. A circuit for generating a sequence of harmonic oscillations from a fundamental frequency oscillation, comprising a parallel tuned circuit having first and second branches, said first branch comprising a coil having a saturable core, said parallel circuit being resonant at said fundamental frequency when said core is saturated, a transistor amplifier having an input circuit and a collector output circuit, diode means connected between said collector output circuit and said parallel tuned circuit, said diode means having the same current pass direction as the current pass direction of the collector current of said transistor amplifier, means applying said fundamental frequency oscillation to said input circuit, a plurality of selection filter means tuned to the frequencies of said harmonic oscillations, and means coupling said coil to said selection filter means.

2. A circuit for generating a sequence of harmonic oscillations from a fundamental frequency oscillation, comprising a parallel tuned circuit having first and second branches, said first branch comprising a serially connected coil and capacitor, said coil having a saturable core, said second branch comprising an inductor, said parallel circuit being resonant at said fundamental frequency when said core is saturated, a transistor having emitter, base and collector electrodes, means applying said fundamental frequency oscillation between said base and emitter electrodes, diode means connected between said collector electrode and said parallel circuit, said diode means being polarized to pass the collector current of said transistor, a plurality of selection filter means tuned to the frequencies of said harmonic oscillations, and means coupling said coil to said selection filters.

3. The circuit of claim 2, comprising means for biasing said transistor for class B operation.

4. The circuit of claim 2, comprising means for biasing said transistor for class AB operation.

5. The circuit of claim 2, in which said coupling means comprises a winding inductively coupled to said coil, first and second output transistors having emitter, base and collector electrodes, means connecting said winding in push-pull between the emitter and base electrodes of said first and second output transistors, a plurality of first and second coils with a first coil and a second coil being inductively coupled to each of said selection filters, means serially connecting said first coils to the collector electrode of said first output transistor, and means serially connecting said second coils to the collector electrode of said second output transistor, said first coils and second coils being connected such that the first and second coils inductively coupled to at least one selection filter have the same sense of winding and that the first and second coils inductively coupled to at least another selection filter have the opposite sense of winding.

6. A circuit for generating a sequence of harmonic oscillations from a fundamental frequency oscillation, comprising a parallel tuned circuit having first and second branches, said first branch comprising a serially connected coil and capacitor, said coil having a saturable core, said second branch comprising an inductor, said parallel circuit being resonant at said fundamental frequency when said core is saturated, first and second transistors each having a base, emitter and collector electrode, means applying said fundamental oscillation in push-pull between the base and emitter electrodes of said first and second transistors, said inductor having a tap, a source of collector operating voltage connected to said tap, first and second diode means connected between the collector electrodes of said first and second transistors respectively and opposite ends of said parallel circuit, said diode means being polarized to pass collector current of the respective transistor, a plurality of selection filter means tuned to the frequencies of said harmonic oscillations, and means coupling said coil to said selection filters.

References Cited in the file of this patent

UNITED STATES PATENTS

| | | |
|---|---|---|
| 2,742,567 | Hansell | Apr. 17, 1956 |
| 2,758,206 | Hamilton | Aug. 7, 1956 |
| 2,868,897 | Hamilton | Jan. 13, 1959 |
| 2,987,627 | Eckert | June 6, 1961 |
| 3,007,058 | Smith | Oct. 31, 1961 |